(12) United States Patent
Thompson et al.

(10) Patent No.: US 8,526,485 B2
(45) Date of Patent: Sep. 3, 2013

(54) USING EQUALIZATION COEFFICIENTS OF END DEVICES IN A CABLE TELEVISION NETWORK TO DETERMINE AND DIAGNOSE IMPAIRMENTS IN UPSTREAM CHANNELS

(75) Inventors: Robert J. Thompson, Monroeton, PA (US); Michael J. Cooper, Marietta, GA (US); Charles S. Moore, Langhorne, PA (US); John L. Moran, Uxbridge, MA (US); Marc L. Morrissette, Plainville, MA (US)

(73) Assignee: General Instrument Corporation, Horsham, PA (US)

( * ) Notice: Subject to any disclaimer, the term of this patent is extended or adjusted under 35 U.S.C. 154(b) by 607 days.

(21) Appl. No.: 12/565,185

(22) Filed: Sep. 23, 2009

(65) Prior Publication Data

US 2011/0069745 A1 Mar. 24, 2011

(51) Int. Cl.
*H04L 5/16* (2006.01)
*H04B 17/00* (2006.01)

(52) U.S. Cl.
USPC .......................................... 375/224; 375/222

(58) Field of Classification Search
USPC ................. 375/224, 222, 227, 347, 349, 229; 348/181, 193; 702/57, 58, 66, 77
See application file for complete search history.

(56) References Cited

U.S. PATENT DOCUMENTS

| | | | |
|---|---|---|---|
| 3,838,221 A | 9/1974 | Schmidt et al. | |
| 4,245,342 A | 1/1981 | Entenman | |
| 4,385,392 A | 5/1983 | Angell et al. | |
| 4,811,360 A | 3/1989 | Potter | |
| 4,999,787 A | 3/1991 | McNally et al. | |
| 5,228,060 A | 7/1993 | Uchiyama | |
| 5,251,324 A | 10/1993 | McMullan, Jr. et al. | |
| 5,271,060 A | 12/1993 | Moran et al. | |
| 5,278,977 A | 1/1994 | Spencer et al. | |
| 5,347,539 A | 9/1994 | Sridhar et al. | |
| 5,390,339 A | 2/1995 | Bruckert et al. | |
| 5,463,661 A | 10/1995 | Moran et al. | |
| 5,532,865 A | 7/1996 | Utsumi et al. | |
| 5,557,603 A | 9/1996 | Barlett et al. | |
| 5,606,725 A | 2/1997 | Hart | |
| 5,631,846 A | 5/1997 | Szurkowski | |
| 5,692,010 A | 11/1997 | Nielsen | |

(Continued)

FOREIGN PATENT DOCUMENTS

| EP | 0905998 A2 | 3/1999 |
|---|---|---|
| EP | 1235402 A2 | 8/2002 |

(Continued)

OTHER PUBLICATIONS

Motorola, "White Paper: Expanding Bandwidth Using Advanced Spectrum Management", pp. 1-12, Sep. 25, 2003.

(Continued)

*Primary Examiner* — Khai Tran
(74) *Attorney, Agent, or Firm* — Stewart M. Wiener

(57) ABSTRACT

A system estimates impairment contributions for upstream communications in a cable television system. The system receives equalization coefficients used by end devices in the cable television system. The equalization coefficients are used by equalizers to mitigate distortion in upstream channels for the end devices. The system analyzes the coefficients based on impairment thresholds to determine whether impairment problems exist and to identify the types of impairment problems that exist.

20 Claims, 6 Drawing Sheets

(56) References Cited

U.S. PATENT DOCUMENTS

| | | |
|---|---|---|
| 5,694,437 A | 12/1997 | Yang et al. |
| 5,732,104 A | 3/1998 | Brown et al. |
| 5,790,523 A | 8/1998 | Ritchie et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al-Araji et al. |
| 6,556,562 B1 | 4/2003 | Bhagavath et al. |
| 6,556,660 B1 | 4/2003 | Li et al. |
| 6,559,756 B2 | 5/2003 | Al-araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,999,408 B1 | 2/2006 | Gomez |
| 7,002,899 B2 | 2/2006 | Azenkot et al. |
| 7,010,002 B2 | 3/2006 | Chow et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,295,518 B1 | 11/2007 | Monk et al. |
| 7,315,573 B2 | 1/2008 | Lusky et al. |
| 7,315,967 B2 | 1/2008 | Azenkot et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 * | 8/2010 | Wajcer et al. ............... 375/220 |
| 7,787,557 B2 | 8/2010 | Kim et al. |
| 7,792,183 B2 | 9/2010 | Massey et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |

| | | |
|---|---|---|
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznik et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0110415 A1 | 5/2011 | Cooper et al. |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |

FOREIGN PATENT DOCUMENTS

| | | |
|---|---|---|
| EP | 1341335 A2 | 9/2003 |
| EP | 1956782 A1 | 8/2008 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2007046876 A1 | 4/2007 |
| WO | 2009146426 A1 | 12/2009 |

OTHER PUBLICATIONS

Cable Television Laboratories, Inc., "Pre-Equalization based proactive network maintenance process model", Invention Disclosure 60177, Jun. 2008.

Campos, L.A., et al., "Pre-equalization based Pro-active Network Maintenance Methodology", Cable Television Laboratories, Inc., (presentation), 2008.

Shelke, Y.R., "Knowledge Based Topology Discovery and Geo-localization", Thesis, Master of Science, Ohio State University, 2010.

Cable Television Laboratories, Inc., "A Simple Algorithm for Fault Localization Using Naming Convention and Micro-reflection Signature," Invention Disclosure 60193, Jun. 2008.

Cable Television Laboratories, Inc., "Pre-Equalization Based Proactive Network Maintenance Process Model for CMs Transmitting on Multiple Upstream Channels," Invention Disclosure 60203, May 2009.

Y. Morishita, et al., "An LMS adaptive equalizer using threshold in impulse noise environments", IEEE, ICT 2003 10th International Conference on Telecommunications, vol. 1, pp. 578-582, Feb. 2003.

PCT Search Report & Written Opinion, RE: Application #PCT/US2012/049685, Mar. 1, 2013.

Cable Television Laboratories, Inc., "Data-Over-Cable Service Interface Specifications DOCSIS 3.0: MAC and Upper Layer Protocols Interface," CM-SP-MULPIv3.0-I16-110623, section 8, pp. 242-266, Jun. 2011.

Cable Television Laboratories, Inc., "Data-Over-Cable Service Interface Specifications DOCSIS® 3.0—Mac and Upper Layer Protocols Interface Specification," CM-SP-MULPIv3.0-I17-111117, Nov. 2011.

Cable Television Laboratories, Inc., "DOCSIS® Best Practices and Guidelines: Proactive Network Maintenance Using Preequalization," CM-GL-PNMP-V01-100415, Apr. 2010.

Cable Television Laboratories, Inc., "DOCSIS® Best Practices and Guidelines: Proactive Network Maintenance Using Pre-equalization," CM-GL-PNMP-V02-110623, Jun. 2011.

Cable Television Laboratories, Inc., Data-Over-Cable Service Interface Specifications—DOCSIS 2.0: Radio Frequency Interface Specification, CM-SP-RFIv2.0-I06-040804, Aug. 2004.

R.L. Howald, et al., "Customized Broadband—Analysis Techniques for Blended Multiplexes," NCTA Technical Papers, 2002.

R. Howald, "Access Networks Solutions: Introduction to S-CDMA," Presentation to Society of Cable Telecommunications Engineers (SCTE) South Florida Chapter, 2009.

R. Howald, "Upstream Snapshots & Indicators (2009)," Regional Samples, Presentation to Society of Cable Telecommunications Engineers (SCTE) South Florida Chapter, Jan. 2010.

R.L. Howald, et al., "Characterizing and Aligning the Hfc Return Path for Successful DOCSIS 3.0 Rollouts", SCTE Cable-Tec Expo, Oct. 2009.

R. Howald, et al., "DOCSIS 3.0 Upstream: Readiness & Qualification," SCTE Cable-Tec Expo, Oct. 2009.

R. Howald, et al., "The Grown-Up Potential of a Teenage PHY", NCTA Convention and Exposition, May 2012.

R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.

R. Hranac, "Linear Distortions, Part 1," Communication Technology, Jul. 2005.

X. Liu, et al., "Variable Bit Rate Video Services in DOCSIS 3.0 Networks," NCTA Technical Papers, 2008.

H. Newton, Newton's Telecom Dictionary, Flatiron Publishing, 9th ed., pp. 216 and 1023 (definitions of "carrier to noise ratio" and "signal to noise ratio"), Sep. 1995.

M. Patrick, et al., "Delivering Economical IP Video over DOCSIS by Bypassing the M-CMTS with DIBA," SCTA 2007 Emerging Technologies, NCTA Technical Papers, 2007.

A. Popper, et al, "An Advanced Receiver with Interference Cancellation for Broadband Cable Networks," International Zurich Seminar on Broadband Communications Access 2002, pp. 23-1 to 23-6, IEEE, 2002.

A. Popper, et al., "Ingress Noise Cancellation for the Upstream Channel in Broadband Cable Access Systems," International Conference on Communications 2002, vol. 3, pp. 1808-1812, IEEE, 2002.

S.U.H. Qureshi, "Adaptive Equalization," Proceedings of the IEEE, vol. 73, No. 9, pp. 1349-1387, Sep. 1985.

S. Ramakrishnan, "Scaling the DOCSIS Network for IPTV," SCTE Conference on Emerging Technologies, NCTA Cable Show, Apr. 2009.

R. Thompson, et al., "256-QAM for Upstream HFC," NCTA 2010 Spring Technical Forum Proceedings, pp. 142-152, May 2010.

R. Thompson, et al., "256-QAM for Upstream HFC Part Two", SCTE Cable-Tec Expo 2011, Technical Paper, Nov. 2011.

R. Thompson, et al., "Multiple Access Made Easy," SCTE Cable-Tec Expo 2011, Technical Paper, Nov. 2011.

R. Thompson, et al., "Optimizing Upstream Throughput Using Equalization Coefficient Analysis", National Cable & Telecommunications Association (NCTA) Technical Papers, Apr. 2009.

R. Thompson, et al., "Practical Considerations for Migrating the Network Toward All-Digital", Society of Cable Telecommunications Engineers (SCTE) Cable-Tec Expo, Oct. 2009.

R. Thompson, et al., "64-QAM, 6.4MHz Upstream Deployment Challenges," SCTE Canadian Summit, Toronto, Canada, Technical Paper, Mar. 2011.

B. Volpe, et al., "Cable-Tec Expo 2011: Advanced Troubleshooting in a DOCSIS© 3.0 Plant," Nov. 2011.

L. Wolcott, "Modem Signal Usage and Fault Isolation," U.S. Appl. No. 61/301,835, filed Feb. 5, 2010.

F. Zhao, et al., "Techniques for minimizing error propagation in decision feedback detectors for recording channels," IEEE Transactions on Magnetics, vol. 37, No. 1, pp. 592-602, Jan. 2001.

\* cited by examiner

USING EQUALIZATION COEFFICIENTS OF END DEVICES IN A CABLE TELEVISION NETWORK TO DETERMINE AND DIAGNOSE IMPAIRMENTS IN UPSTREAM CHANNELS

BACKGROUND

Cable television networks, including community antenna television (CATV), hybrid fiber-coaxial (HFC), and fiber networks, have been in widespread use for many years and are extensive. The extensive and complex cable networks are often difficult for a cable operator to manage and monitor. A typical cable network generally contains a headend which is usually connected to several nodes which provide bi-directional content to a cable modem termination system (CMTS). In many instances, several nodes may serve a particular area of a town or city. The CMTS contains several receivers, and each receiver connects to several modems of many subscribers. For instance, a single receiver may be connected to hundreds of modems at customer premises. Data may be transmitted downstream to the modems on different frequency bands. The modems communicate to the CMTS via upstream communications on a dedicated frequency band, referred to as a return band.

Cable networks are also increasingly carrying signals, which require a high quality and reliability of service, such as Voice over IP (VoIP) communications. Any disruption of voice or data traffic is a great inconvenience and often unacceptable to a customer. Various factors may affect the quality of service, including the quality of the upstream channels. One factor that affects the quality of upstream communications is the presence of up-stream channel impairments, such as micro-reflections (MRs) of communication signals, group delay variation (GDV), and amplitude distortion (AD).

AD is an undesirable variation in the channel's amplitude response. Common forms of AD include tilt, ripple, and roll-off. A common cause of AD is upper return band-edge carriers, aggravated by long reaches of a cable network plant. The long reaches accumulate diplex filters from devices including amplifiers and in-line equalizers. While individually contributing small attenuation versus frequency, the accumulated diplex filters can create appreciable response variation. In a QAM constellation, the amplitude roll-off causes the symbols to spread in a pattern similar in appearance to Additive White Gaussian Noise (AWGN) and causes received symbols to cross decision boundaries, resulting in errors.

GDV is an undesirable variation in the communication channel's phase response, resulting in distortion of the digital signal phase, or a variation in the propagation of frequency components of the signal across the channel. As is the case for AD, one major cause of GDV in the plant is upper-band-edge operation, combined with long reaches of cable network plant. The reasoning is the same as in the AD case. Note that filtering functions typically induce nonlinear phase responses as the band edges are approached, so the combination of AD and GDV in the same band region is perfectly expected, with the understanding that diplex filtering is the cause. Different filter functions induce different GDV responses, in a similar manner that different filter functions induce different stop-band characteristics. It is typical that the sharper the roll-off, such as would be the case for long cascades, the worse the GDV will be. In a QAM constellation, GDV causes the symbols to spread in a pattern similar to AWGN and AD and causes received symbols to cross decision boundaries, resulting in errors. 16-QAM is less sensitive to GDV than 64-QAM because of reduced decision boundary size of 64-QAM.

As seen by a receiver, a MR is a copy of the transmitted signal, arriving late and with reduced amplitude. The result of the additional copy is the typically seen by end users as image ghosting in analog video reception, whereas for digital communications the result is inter-symbol interference (ISI). MR sources are composed of pairs of hybrid fiber-coaxial (HFC) components separated by a distance of cable. The HFC components, also referred to as cable network components, facilitate the propagation of signal copies in a variety of ways including return loss, isolation, mixing, and combining. For instance, the MR may arise if a length of cable separates two devices with poor return loss, acting as signal reflectors. The reflector return loss and the loss between the reflectors determine the amplitude of the MR. Any HFC component, for instance a cable modem (CM), has the potential to act as a signal reflector. Note that the CM typically has as a design limit of 6 dB return loss, meaning it may reflect up to 25% of its incident power. In the cable network plant, components other then the CM typically reflect a lower percentage of incident power because the design limits are typically significantly better. However, as the cable network plant ages and elements that contribute to good RF matching degrade, for instance connectors, cable, splitters, and interfaces on printed circuit boards (PCBs), the reflected percentage of incident power increases.

These upstream channel impairments are known to be mitigated by the fundamental digital communications receiver function of equalization. During equalization, an equalizer generates coefficient information that is used to create an equalizing filter, with an inverse channel response, canceling distortion in the channel caused by the upstream channel impairments. The equalization coefficients in Data Over Cable Service Interface Specification (DOCSIS) 2.0 and DOCSIS 3.0 are 24 symbol-spaced coefficients (also referred to as taps). Equalization is part of virtually all modern telecommunications platforms, and is instrumental in proper return operation for all DOCSIS systems.

In order to offer higher data rates to subscribers in the competitive world of high-speed data and Internet access, operators must take advantage of the throughput benefits gained from leveraging more complex digital modulation schemes, such as 32-QAM and 64-QAM. Use of 32-QAM allows, for example, a 20 Mbps 16-QAM upstream to become a 25 Mbps upstream. On the other hand, for 64-QAM, it allows a 16-QAM, 20 Mbps upstream channel to become a 30 Mbps channel. This represents a 25-50% throughput improvement. Unfortunately, channels using these digital modulation schemes are also considerably more sensitive to digital communication channel impairments, including the upstream impairments described above, than the 16-QAM channels they are often replacing in the return band.

Given the potential problems that can be caused by the upstream impairments, upstream channels are one of the most challenging digital communication channels to manage and fully exploit. Operators prefer to ensure that capacity associated with the upstream channel, or as much of the capacity as possible, is realized for services and revenue. To do so requires a thorough understanding of a diverse set of HFC and digital communications variables. More importantly, variables that did not matter very much for 16-QAM operation now become not just relevant, but critical to understand for successful deployment of 64-QAM, and to a lesser extent, 32-QAM. Accurately diagnosing upstream issues typically requires technicians or engineers to be at multiple locations within a HFC plant and simultaneously inject test signals at the suspected device locations. This diagnostic process requires extensive manual effort, often requiring rolling trucks to remote locations within a plant or specialized test equipment. The diagnostic process is also time consuming and costly.

SUMMARY

According to an embodiment, a system estimates impairment contributions for upstream communications in a cable television system. The system receives equalization coefficients used by end devices in the cable television system. The equalization coefficients are used by equalizers to mitigate distortion in upstream channels for the end devices. The system analyzes the coefficients based on impairment thresholds to determine whether impairment problems exist in the upstream channels and to identify the types of impairment problems that exist. Other embodiments include computer-implemented methods estimating impairment contributions for upstream communications based on received equalization coefficients and impairment thresholds.

Embodiments interpret equalization coefficients for end devices and identify potential impairments of upstream channels for the end devices based on an analysis of the equalization coefficients. Also, a particular type of impairment problem can be identified based on the analysis of equalization coefficients. Determination of the type of impairment can be coupled with additional information, such as location of the end device or tap, to determine suspect cable network components that may be causing the impairment. Thus, identification of an impairment problem and potential solutions can be determined before a customer problem is experienced and without dispatching technicians to diagnose the problem.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

The abbreviation "decibels relative to a carrier (dBc)" refers to a measure of the power ratio of a signal to a carrier signal, and is expressed in decibels. Note "dB" refers to a decibel, "ns" refers to a nanosecond, and "MHz" refers to a megahertz.

The term "equalization coefficient" refers to complex tap values used to create an equalizing filter with an inverse channel response.

The term "impairment contribution" refers to causes of impairment in an upstream hybrid fiber coaxial (HFC) plant.

The term "micro-reflection (MR)" refers to an impairment contribution wherein a copy of a communication signal is reflected back onto itself, with a time delay. Significant MRs can degrade upstream HFC plant performance.

The term "group delay variation (GDV)" refers to an impairment contribution wherein different frequency components of a signal propagate through a network component with different time delays.

The term "cable network plant components" refers to any component that may cause impairment in an upstream channel in the cable network. The components may be components of an HFC network, and may be active or passive components. The upstream channel may be a channel between a modem and a CMTS or another upstream channel in the cable network.

Figure 1:
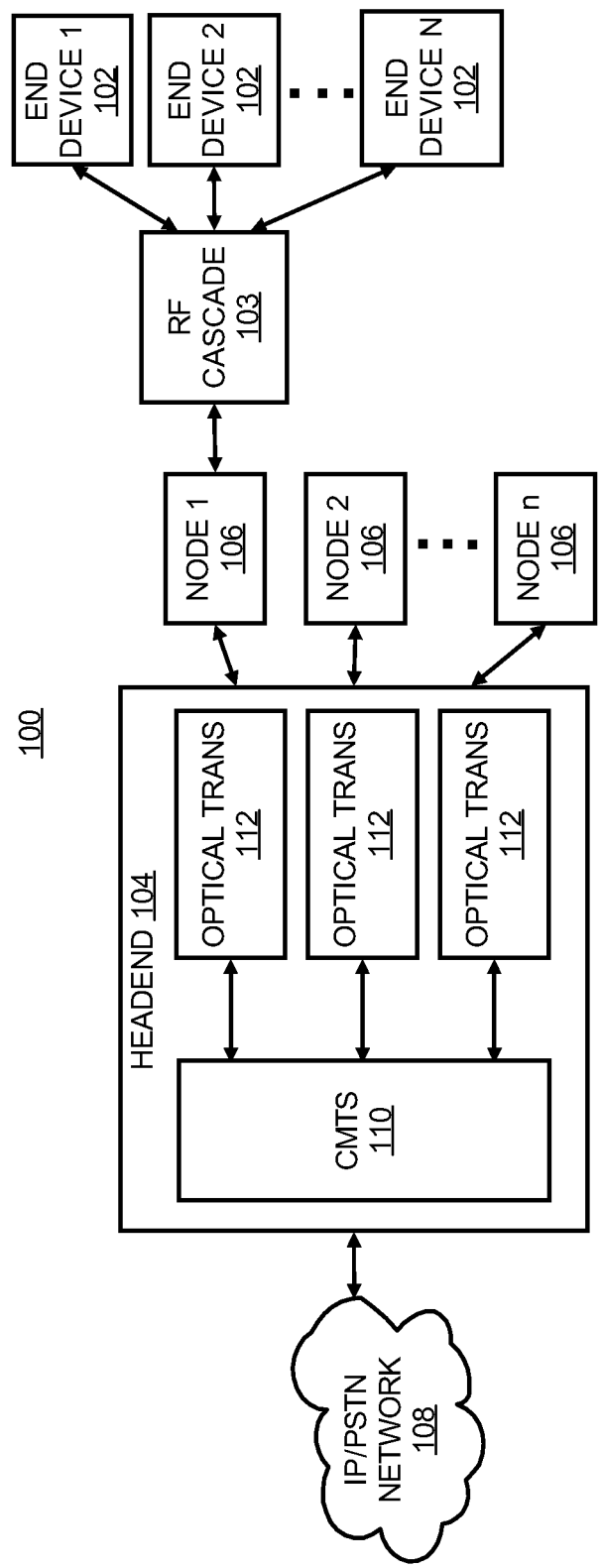
FIG. 1 illustrates a block diagram of a cable network, according to an embodiment of the invention.

FIG. 1 illustrates a network 100, such as an HFC network, including end devices 102. The end device 102 may be DOCSIS Terminal devices, such as cable modems (CMs), modem terminal adapters, MTAs, and embedded cable modems of DOCSIS set-top gateways (eCMs of DSGs), or any other like devices. The end devices 102 are connected to a headend 104 of the network 100 via nodes 106 and an RF cascade 103 comprised of multiple amplifiers and passive devices including cabling, taps, splitters, and in-line equalizers. A network tap is a hardware device providing access to data within the network 100. The network tap provides the ability to monitor data between two points, for instance components, in the network 100. An impairment contribution estimator 200, shown in FIG. 3, may be connected to the network 100 through any network access point including a tap. The headend 104 connects to an IP (Internet Protocol) and/or PSTN (Public Switched Telephone Network) network 108. Data, such as TV programs, audio, video and other data, which may be from the network 108, is sent from the headend 104 to the end devices 102. In addition, the end devices 102 may send data upstream towards the headend 104. Although not shown, each of the nodes 106 may be connected to multiple end devices.

As illustrated in FIG. 1, the headend 104 includes a CMTS 110 and optical transceivers 112 which provide optical communications to and from the CMTS 110 through optical fiber to the nodes 106. Typically, the nodes 106 connect to the headend 104, and the headend 104 contains a plurality of CMTS units 110. Each CMTS 110 contains a plurality of transceivers, which communicate with the plurality of end devices 102. For example, each CMTS 110 may have eight or more receivers (e.g., for DOCSIS 2.0), and each receiver may communicate with hundreds of end devices 102. The CMTS may have more than eight receivers (e.g., DOCSIS 3.0 may use 48 receivers).

Figure 2:
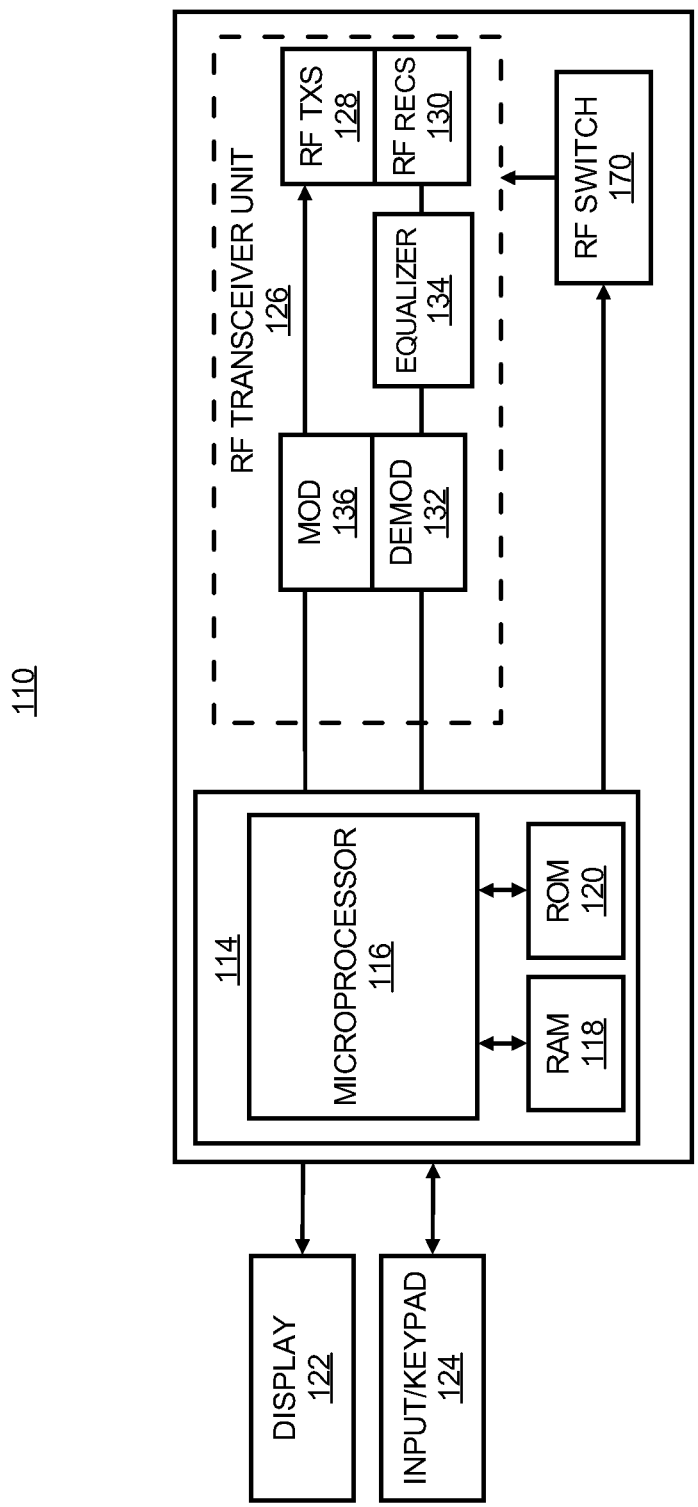
FIG. 2 illustrates a CMTS architecture, according to an embodiment of the invention.

FIG. 2 illustrates an architecture of the CMTS 110, according to an embodiment. As illustrated, the CMTS 110 includes a processing unit 114 having a microprocessor 116 that receives information, such as instructions and data, from a RAM 118 and a ROM 120. The processing unit 114 controls the operation of the CMTS 110 and RF communication signals to be sent by the end devices 102 to the CMTS 110. The processing unit 114 is connected to a display 122, which may display status information such as whether station maintenance (SM) is being performed, or a receiver is in need of load balancing. An input keypad 124 may also be connected to the processing unit 114 to permit an operator to provide instructions and process requests.

The CMTS 110 also includes an RF transceiver (transmitter/receiver) unit 126 having transmitters 128 and receivers 130 providing bi-directional communication capability with the end devices 102 through optical transceivers 112, nodes 106 and an RF cascade 103 comprised of multiple amplifiers and passive devices including cabling, taps, splitters, and in-line equalizers. The CMTS 110 may contain a plurality of RF receivers 130, such as eight RF receivers and a spare RF receiver. Each of the RF receivers 130 may provide support for a hundred or more end devices 102.

By way of example, the receivers 130 can be BROADCOM 3140 receivers that each includes a demodulator unit 132 and an equalizer 134 to which received RF signals are provided, for instance, for purposes of acquiring equalizer values and burst modulation error ratio (MER) measurements, packet error rate (PER) and bit error rate (BER). The equalizer 134 can be a multiple tap linear equalizer (e.g. a twenty-four tap linear equalizer), which also is known as a feed forward equalizer (FFE). The equalizer 134 can be integrally contained in the RF receiver, or alternatively, may be provided as a separate device. The communication characteristics of each receiver 130 may be stored on ROM 120 or RAM 118, or may be provided from an external source. Note that the equalizer 134 is in the upstream path, for example, from the end devices 102 towards the network 108.

The RF transceiver unit 126 also includes a modulator 136, which provides the modulated signals to RF transmitters 128. The modulator 136 and demodulator 132 are capable of modulation schemes of various levels of complexity. For example, some upstream DOCSIS 2.0 modulation schemes that may be used in order of level of complexity include, but are not limited to 16 QAM, 32 QAM, 64 QAM and 128 QAM. The microprocessor 116 may provide instructions to the end devices 102 as to which modulation scheme is to be used during communication.

The CMTS 110 also provides instructions for the end devices 102 using a transmit pre-equalization (PRE-EQ) feature in order to compensate for upstream channel impairments. The CMTS 110 receives an incoming signal from each of the end devices 102 and compares the incoming signal with an expected signal, which is an ideal response. If the incoming signal received by the CMTS 110 differs from the expected signal, the microprocessor 116 or other processing device performing a PRE-EQ function then determines a set of equalization coefficients (alternately referred to as transmit pre-equalization coefficients) for each of the end devices 102 and instructs the end devices 102 to set their transmit equalization coefficients to the transmit pre-equalization coefficients determined by the PRE-EQ function. The end devices 102 apply the pre-equalization coefficients and then continue to transmit. The CMTS 110 thereafter continues to monitor and compare the incoming signal against the expected signal.

Figure 3:
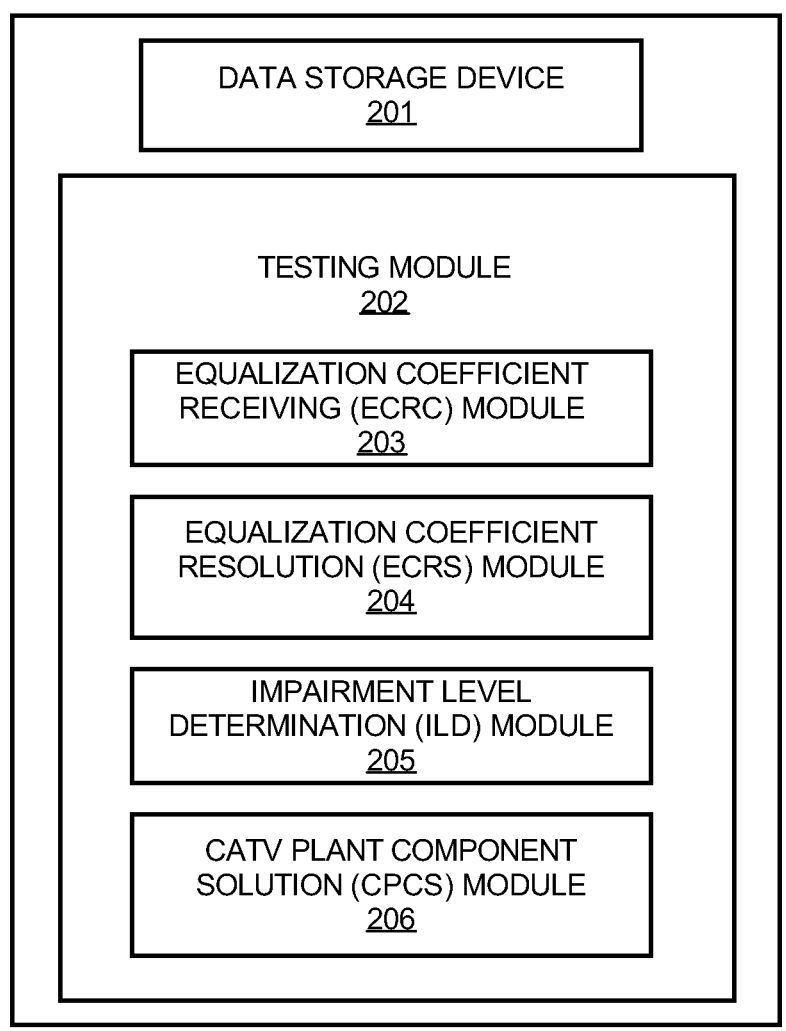
FIG. 3 illustrates a device for estimating impairment contributions and isolating defective network components, according to an embodiment of the invention.

FIG. 3 illustrates an architecture of an impairment contribution estimator 200. The impairment contribution estimator 200 may be connected to the network 100 through any network access point, for instance through a network access terminal. The impairment contribution estimator 200 is configured for estimating impairment contributions and isolating defective network components in the system 100 according to the method 300 below. As such, the impairment contribution estimator 200 includes a data storage device 201, and a testing module 202. The testing module 202 includes an equalization coefficient receiving (ECRC) module 203, an equalization coefficient resolution (ECRS) module 204, an impairment level determination (ILD) module 205, and a cable network plant components isolation (CPCI) module 206. The testing module 201 may also include a modulation configuration (MC) module (not shown).

The data storage device 201 is configured to store an impairment threshold for at least one impairment contribution. The ECRC module 203 is configured to receive equalization coefficients from the end devices 102. The equalization coefficients are thereafter stored in the data storage device 201. The ECRS module 204 is configured to resolve the equalization coefficients into the at least one impairment contribution. The ILD module 205 is configured to determine whether each of the end devices 102 exceeds the impairment threshold and to group each of the end devices 102 into sets that exceed impairment thresholds as impaired sets or sets that do not exceed impairment thresholds as unimpaired sets. The CPCI module 206 is configured to identify cable network plant components associated with each of the ILD sorted sets wherein the cable network plant components are designated as suspect components. cable network plant components are correlated with each set of end devices, for example, based on whether they are used in an upstream or downstream path for an end device.

Figure 5:
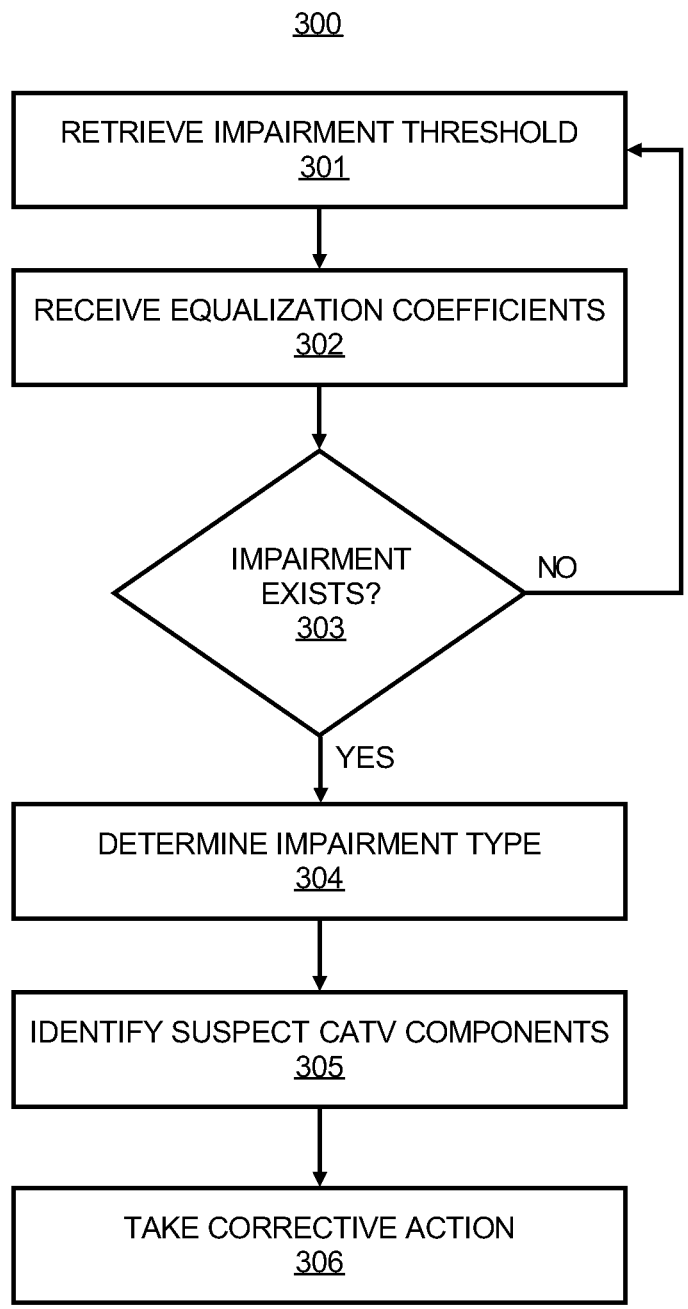
FIG. 5 illustrates a method for estimating impairment contributions and isolating defective network components using a plurality of end devices, according to an embodiment of the invention.
Figure 6:
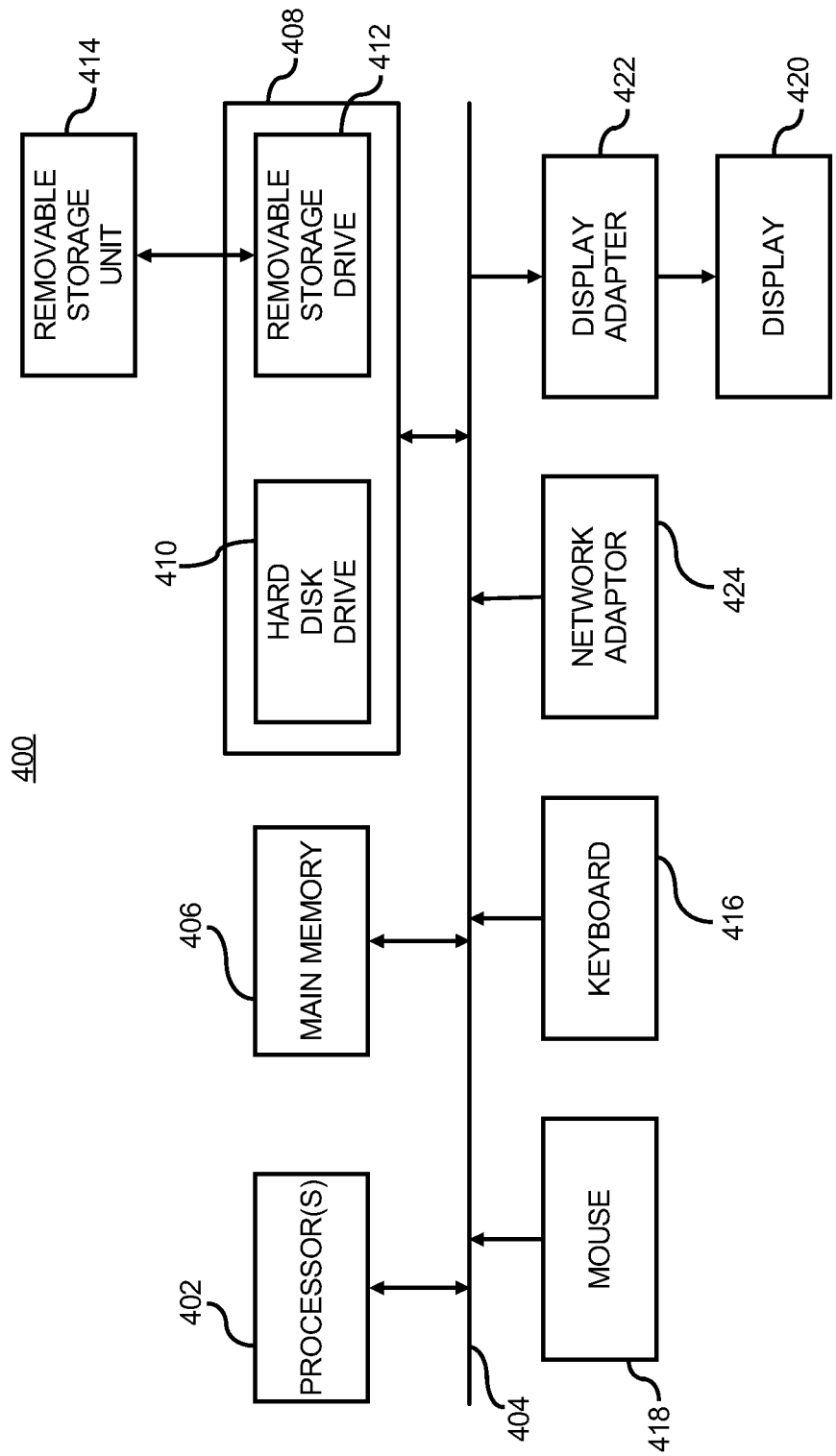
FIG. 6 shows a block diagram of a computer system that may be used for estimating impairment contributions and isolating defective network components, according to an embodiment of the invention.

The components 202-206 are configured to perform the method 300 described with respect to FIG. 5. The components 202-206 may comprise software modules, hardware modules, and a combination of software and hardware modules. Thus, in one embodiment, one or more of the modules 202-206 comprise circuit components. In another embodiment, one or more of the modules 202-206 comprise software code stored on a computer readable storage medium, which is executable by a processor. It should be understood that the impairment contribution estimator 200 depicted in FIG. 3 may include additional components and that some of the components described herein may be removed and/or modified without departing from a scope of the impairment contribution estimator 200. According to an embodiment, the impairment contribution estimator 200 comprises a part of a network device such as a RF-Sentry application. According to another embodiment, the impairment contribution estimator 200 comprises a part an edge router, such as a part of the advanced spectrum management function of the BSR64000 edge router.

Figure 4:
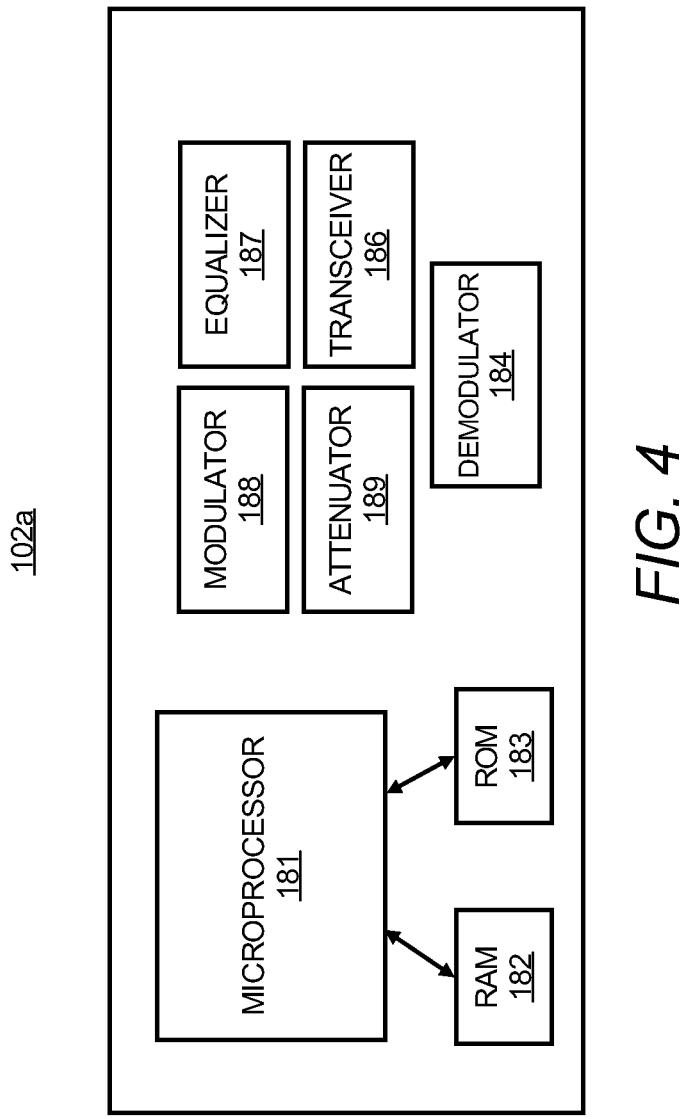
FIG. 4 illustrates a device for estimating impairment contributions and isolating defective network components, according to an embodiment of the invention.

FIG. 4 illustrates an embodiment of one of the end devices 102 (shown as 102a), such as a cable modem. The end device 102a contains a processor 181 which communicates with a RAM 182 and ROM 183 and which controls the general operation of the end device 102, including applying the pre-equalization coefficients and controlling preamble lengths of communications sent by the end device 102a in accordance with instructions from the CMTS 110. The end device 102a also contains a transceiver 186 which provides bidirectional RF communication with the CMTS 110. A demodulator 185 demodulates signals received by the transceiver 186, and an equalizer 187 biases communications transmitted to the CMTS 110. For example, the equalizer 187 is connected in the upstream path between a transmitter in the transceiver 186 and the CMTS 110. The microprocessor 181 configures the equalizer 187 using the coefficients received from the CMTS 110 to compensate for upstream impairments. The end device 102a also contains a modulator 188, which modulates signals to be transmitted upstream to the CMTS 110 according to a modulation scheme, which the end device 102a has been instructed to use by the CMTS 110. In addition, the end device 102a has an attenuator 189 controlled by microprocessor 181 to attenuate signals to be transmitted by the RF transmitter to be within a desired power level. Those of skill in the art will appreciate that the components of end device 102a have been illustrated separately only for discussion purposes and that various components may be combined in practice.

By way of example, the end device 102a may be a DOCSIS network element, such as a cable modem, to generate a variety of test signals. Accordingly, the test signals may be implemented using one of the available upstream DOCSIS bandwidths, e.g. 200 kHz, 400 kHz, 800 kHz, 1600 kHz, 3200 kHz or 6400 kHz.

Accurate knowledge of the available and/or optimum modulation schemes of the network 100 enables the operator to utilize available resources of their network more efficiently, such as by adding additional end devices to improve portions of the network with the least complex modulation schemes so that those portions may be able to use more complex modulation schemes.

It will be apparent that the system 100 may include additional elements not shown and that some of the elements described herein may be removed, substituted and/or modified without departing from the scope of the system 100. It should also be apparent that one or more of the elements described in the embodiment of FIG. 1 may be optional.

An example of a method in which the system 100 and the impairment contribution estimator 200 may be employed for estimating impairment contributions and isolating defective network components using the end devices 102 will now be described with respect to the following flow diagram of the method 300 depicted in FIG. 5. It should be apparent to those of ordinary skill in the art that the method 300 represents a generalized illustration and that other steps may be added or existing steps may be removed, modified or rearranged without departing from the scopes of the method 300. In addition, the method 300 is described with respect to the system 100 by way of example and not limitation, and the method 300 may be used in other systems.

Some or all of the operations set forth in the method 300 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

At step 301, as shown in FIG. 5, the impairment contribution estimator 200 retrieves at least one impairment threshold corresponding to an impairment contribution from the data storage 201. The impairment contribution may be selected from the group including GDV, AD, MR and any impairment contribution that may be isolated by analysis of the coefficients as described in detail at step 303 below. At least one impairment threshold corresponding to the impairment contribution may be selected from the group comprising an industry standard specification, a customer preferred limit, a PRE-EQ failure limit, a PRE-EQ failure limit less acceptable system margin and, where applicable, a function of signaling characteristics. Signaling characteristics include, for instance, RF frequency, QAM modulation level, bandwidth, symbol rate, forward error correction (FEC) settings, and other properties related to signaling.

To illustrate, where the impairment contribution is GDV, the impairment threshold may be selected from the group comprising the industry standard specification (for GDV), the customer preferred limit, the PRE-EQ failure limit, the PRE-EQ failure limit less acceptable system margin and a function of a radio frequency (RF) cascade. The function of the RF cascade may comprise a to-be-determined (TBD) value in ns/MHz per RF Amplifier. For instance, a DOCSIS assumption for GDV is 200 ns/MHz.

Next, where the impairment contribution is AD, the impairment threshold may be any of the industry standard specification. For instance any of a DOCSIS assumption for amplitude ripple of $\leq 0.5$ dB per MHz, the customer preferred limit, the PRE-EQ failure limit, the PRE-EQ failure limit less acceptable system margin and a function of RF frequency and RF amplifier cascade length.

Similarly, where the impairment contribution is MR, the impairment threshold may be any of the industry standard specification. For instance a DOCSIS assumption of $-10$ dBc@$<=0.5$ μsec (alternately $-20$ dBc@$<=1.0$ μsec, or $-30$ dBc@$>1.0$ μsec) for a single dominant MR, the customer preferred limit, the PRE-EQ failure limit, the PRE-EQ failure limit less acceptable system margin, and a function of RF frequency. Simulation and tests may be performed to determine the highest MR impairment level that is correctable using DOCSIS 2.0/3.0 PRE-EQ. The results of these simulations may be used to define the PRE-EQ failure limit.

Further, the impairment contribution may comprise any impairment contribution that may be isolated by analysis of the coefficients, for instance as described at step 303 below. After the impairment contribution has been isolated, the at least one impairment threshold corresponding to the impairment contribution may be thereafter selected in a similar manner as described above with regard to the impairment threshold for AD, MR, and GDV.

At step 302, the impairment contribution estimator 200 determines the equalization coefficients currently being used by the end devices 102 for upstream communication. The equalization coefficients may be received from the end devices 102 or the CMTS 110. The end devices 102 may comprise at least one of the group comprising DOCSIS terminal devices, including cable modems (CMs), modem terminal adapters, (MTAs), and embedded cable modems of DOCSIS set-top gateways, (eCMs of DSGs). The resolution of the 24-tap equalizer of DOCSIS 2.0 more effectively identifies impairments, compared to the 8-tap equalizer of DOCSIS 1.1. In a current HFC plant, in order to more effectively identify impairments, the majority of the end devices 102 are required to support at least DOCSIS 2.0 with the pre-equalization feature enabled.

The ECRC module 203 may be configured to query the end devices 102 (preferably a DOCSIS 2.0 CM population) using a simple network management protocol (SNMP) query tool such as a modem PRE-EQ response tool. The modem PRE-EQ response tool, developed by MOTOROLA, is operable to query multiple DOCSIS terminal devices based on an Internet protocol (IP) address list. The modem PRE-EQ response tool is operable to conduct periodic polls of coefficient values and other relevant physical layer (PHY) metrics and to subsequently display the results of the periodic polls and/or to store the results of the periodic polls into a log file for post processing. The modem PRE-EQ response tool also provides users with a graphical view of the impulse response or alternately the amplitude response for each CM poll. The modem PRE-EQ response tool is operable to establish a baseline of performance, and may be used to identify defective network components based on CM IP addresses of the plurality of end devices.

At step 303, the impairment contribution estimator 200 determines whether an impairment problem exists for upstream communications from the end devices 102. The determination is based on an analysis of the coefficients determined from step 302 and may be based on the impairment thresholds determined from step 301. There may be multiple techniques for determining whether an impairment problem exists. In one embodiment, the coefficients are analyzed to determine whether any of the impairment thresholds are exceeded. For example, based on experience, certain coefficient values are associated with certain impairment problems and exceeded impairment thresholds. A table may be stored that includes sets of coefficient values (e.g., impairment coefficient signatures) and the type of impairment problem associated with each set of values. This tables of signatures is compared against each of the coefficients determined at step 302. If an impairment coefficient signature is found in coefficients determined at step 302, then the end device using those coefficients is determined to have the particular type of impairment associated with the signature as indicated in the table. Thus, at least two determinations may be made. One determination is whether an impairment problem exists, such as unsatisfactory GDV, AR, MR, etc. Then, if an impairment problem exists, at step 304, a second determination is made which identifies the type of impairment.

According to an embodiment, at step 303, to determine if an impairment problem exists, the ECRS module 204 performs a Fast Fourier Transform (FFT) function on the equalization coefficients for the end devices 102 (e.g. a set of 24 complex coefficients in DOCSIS 2.0), and determines frequency domain information, including a frequency response. For instance, the ECRS module 204 may use a 1024-point FFT to arrange the equalization coefficients for the PRE-EQ baseline and determine the optimal translation of the equalization coefficients. The frequency domain information may be interpreted in multiple ways including in terms of magnitude versus frequency, phase versus frequency, and group delay versus frequency. Based on these magnitudes, a determination is made as to the type of impairment problem that exists, if any exists. For example, negligible amplitude correction but increased correction for phase and group delay is indicative of a GDV impairment. Similarly, other types of impairments can be determined. For example, the end devices 102 are sorted into sets, on increasing levels that sum the DOCSIS PRE-EQ regions for each of the end devices 102, according to the impairment that the ECRS module 204 is configured to determine. For example, the ECRS module 204 may determine which of the end devices 102 experiences the greatest amount of MR impairment contribution by sorting on the levels which result from summing the taps located in the post-tap region of each tap of the 24-tap equalizer of DOCSIS 2.0.

At step 304, the ILD module 205 determines the type of impairment for each end device, for example, if the impairment threshold is exceeded for the end device. In one embodiment, the ILD module 205 groups each of the end devices 102 into impairment level determined (ILD) sets. The ILD sets include impaired sets comprising end devices that exceed impairment thresholds and unimpaired sets comprised of end devices that do not exceed impairment thresholds as unimpaired sets. Furthermore, the impairment sets may include sets by type of impairment and may indicate the level of impairment for each end device. In one embodiment, the ILD module 205 determines the relation of the measured impairment contribution to the impairment threshold for each of the impairment contributions. If the impairment contribution exceeds the impairment threshold, the upstream impairments may be at a level at which a customer problem is experienced. Alternately, if the impairment threshold has an acceptable system margin, the ILD module 205 is configured to provide information so that an end user may perform preventive maintenance. The ILD module 205 may also be configured to determine a dominant impairment contribution. For instance, the ILD module 205 may analyze the translation of the equalization coefficients of the end devices 102, and an expected translation of the equalization coefficients for each of the impairment contributions in order to determine the dominant impairment contribution. The expected translation of the equalization coefficients for each of the impairment contributions comprises a translation of equalization coefficients for a channel with a single impairment, for instance AD.

The operation of the ILD module 205 may be enhanced by application of an increased understanding of the different impairment contributions and how they originate in HFC plant. For example, although an MR source has been discussed in the preceding section regarding MRs, combining an understanding of other probable permutations of MR sources with the location of the ILD sets increases the probability of successful isolation of the MR sources. The understanding of probable sources may be used to eliminate possible sources of the impairment contribution and to therefore isolate the source of the impairment contribution. The results may be used to define what impairment levels will likely result in service calls, and thereafter impairment thresholds as defined at step 301 may be determined. Further, the ILD module 205 may be configured to prioritize the impaired sets or prioritize end devices in each set according to level of impairment.

At step 305, suspect cable network components are identified that are probable causes for the type of impairment being experienced by an end device. Identification of the suspect components may be based on experience or historical analysis of past impairments and their fixes. For example, the CPCI module 206 identifies cable network plant components associated with each of the impaired sets. This process of identification may be enhanced by consulting data regarding the end devices 102 and network components between each of the plurality of end devices and the CMTS 110. The CPCI module 206 identifies the cable network components associated with impaired sets as suspect components. The CPCI module 206 then leverages the end devices 102 to isolate those experiencing an impairment problem related to a specific impairment contribution. For example, a query of the end devices 102 may reveal that all of the end devices 102 located off a particular node are reporting a MR impairment contribution above the impairment threshold for MR, while the other end devices 102, unimpaired sets are not reporting a problem.

At step 306, corrective action is taken. For example, the operator physically inspects all suspect components isolated at step 305 and repairs and replaces as necessary the defective components. The impairment contribution estimator 200 may provide guidance helping cable operators decide the significance of the information that they are analyzing. The impairment contribution estimator 200 may contain a checklist of possible sources of the impairment contribution, preferably sorted in order of probability. For instance, inspection of the suspect components may show that the MR impairment contribution source is a combination of tap-to-output port isolation loss and an improperly terminated cable splice at the end of a feed amplifier. By properly terminating the splice, the operator may reduce the MR to negligible amplitudes. Alternately, the impairment contribution estimator 200 may sort the impaired sets into a less impaired set of devices and a more impaired set of devices according to a level of impairment and route traffic to another channel that the impairment contribution estimator 200 indicates is less impaired.

The steps of the method 300 may be repeated periodically and for each of the end devices 102 or groups of end devices to detect future impairment problems and to ensure that detected impairment problems are eliminated and the improvements are sustainable. If the operator is preparing to upgrade the network 100 to a higher modulation scheme, for instance upgrading from 16-QAM to 64-QAM, the operator may perform the method 300 in order to determine potential problem components. In order to test the network 100, the operator may configure the network at the higher modulation scheme. Thereafter, the operator may perform the testing process of the method 300, designating the suspect components as potential upgrade components.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

Embodiments of the present invention interpret equalization coefficients for end devices and identify potential impairments of upstream channels for the end devices based on an analysis of the equalization coefficients. Also, a particular type of impairment problem can be identified based on the analysis of equalization coefficients. Determination of the type of impairment can be coupled with additional information, such as location of the end device or tap, to determine suspect cable network components that may be causing the impairment. Thus, identification of an impairment problem and potential solutions can be determined before a customer problem is experienced and without dispatching technicians to diagnose the problem.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are meant in their broadest reasonable sense unless otherwise indicated.

What is claimed is:

1. A system for identifying suspect cable network plant components causing an upstream impairment, the system comprising:
    a data storage device configured to store an impairment threshold for at least one impairment contribution; and
    a testing module configured to perform a testing process, the testing module including
        an equalization coefficient receiving module (ECRC) configured to receive equalization coefficients from a plurality of end devices; and
        an impairment level determination (ILD) module configured to determine whether an impairment exists for each of the end devices and to determine a type of impairment using the received equalization coefficients and the impairment threshold.

2. The system of claim 1, wherein the at least one impairment contribution comprises at least one of group delay variation (GDV), amplitude distortion (AD), micro-reflection (MR), and an impairment contribution isolated by analysis of the equalization coefficients.

3. The system of claim 1, wherein the at least one impairment contribution includes a plurality of impairment contributions and the ILD module is further configured to compare the plurality of impairment contributions to determine a dominant impairment contribution.

4. The system of claim 1, further comprising:
    an ECRC module configured to receive a set of equalization coefficients after corrective action for the suspect components is performed and to inform an operator whether the corrective action was effective.

5. The system of claim 1, wherein the equalization coefficients are translated into frequency domain information to determine whether an impairment exists.

6. The system of claim 1, further comprising:
    an impairment contribution estimator configured to provide a checklist of possible sources of the impairment contribution.

7. The system of claim 1, further comprising:
    a modulation configuration (MC) module operable to configure the system to a more advanced modulation scheme; and
    wherein the testing module is further configured to perform a test on the system at the more advanced modulation scheme and to designate the suspect components as potential upgrade components.

8. A method for estimating impairments for a plurality of end devices, the method comprising:
    retrieving an impairment threshold for at least one impairment contribution from a data storage device;
    receiving equalization coefficients for the plurality of end devices;
    determining whether an impairment exists for each of the plurality of end devices using the equalization coefficients and a determination of whether the impairment threshold for the at least one impairment contribution is exceeded; and
    if an impairment exists for one or more of the plurality of end devices, then determining a type of impairment for each existing impairment.

9. The method of claim 8, wherein the type of impairment is determined from the impairment contribution for the exceeded threshold.

10. The method of claim 8, further comprising:
    identifying suspect cable network components causing each impairment at least from the determined type of impairment.

11. The method of claim 10, further comprising:
    inspecting the suspect components to identify defective components;
    performing a corrective action on the defective components;
    receiving a corrected set of equalization coefficients; and
    determining whether the corrective action was not effective.

12. The method of claim 8, wherein the impairment contributions are taken from the group comprising GDV, AD, MR and other impairment contributions that may be isolated by analysis of the equalization coefficients.

13. The method of claim 8, wherein the impairment threshold for the at least one impairment contribution comprises one of an industry standard specification, a customer preferred limit, a PRE-EQ failure limit, a PRE-EQ failure limit less acceptable margin, and a function of signaling characteristics.

14. The method of claim 8, wherein the plurality of end devices comprises at least one of the group comprising DOCSIS terminal devices, including cable modems (CMs), modem terminal adapters, (MTAs), and embedded cable modems of DOCSIS set-top gateways (eCMs of DSGs).

15. The method of claim 8, further comprising:
sorting the plurality of end devices into sets that exceed the impairment contribution threshold, wherein end devices are grouped by similar communication channel characteristics and shared common path through a cable network plant components to a CMTS.

16. The method of claim 15, further comprising:
prioritizing the suspect components according to level of impairment.

17. The method of claim 15, further comprising:
sorting impaired sets into a less impaired set of end devices and a more impaired set of end devices according to a level of impairment; and
routing a modulation scheme through the more impaired set of end devices and a more advanced modulation scheme through the less impaired set of end devices.

18. A computer readable storage device storing at least one computer program that when executed by a computer system performs a method comprising:
retrieving an impairment threshold for at least one impairment contribution from a data storage device;
receiving equalization coefficients for a plurality of end devices;
determining whether an impairment exists for each of the plurality of end devices using the equalization coefficients and a determination of whether the impairment threshold for the at least one impairment contribution is exceeded; and
if an impairment exists for one or more of the plurality of end devices, then determining the type of impairment for each existing impairment.

19. The computer readable storage device of claim 18, wherein the type of impairment is determined from the impairment contribution for the exceeded threshold.

20. The computer readable storage device of claim 18, wherein the method comprises:
identifying suspect cable network components causing each impairment at least from the determined type of impairment.

* * * * *